United States Patent
Ochs

(10) Patent No.: US 7,849,735 B2
(45) Date of Patent: Dec. 14, 2010

(54) APPARATUS AND METHOD FOR TESTING FLOW NOISE

(75) Inventor: Juergen Ochs, Moensheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 316 days.

(21) Appl. No.: 12/111,344

(22) Filed: Apr. 29, 2008

(65) Prior Publication Data

US 2008/0271536 A1  Nov. 6, 2008

(30) Foreign Application Priority Data

May 4, 2007 (DE) .................. 10 2007 020 878

(51) Int. Cl.
*G01M 17/00* (2006.01)
(52) U.S. Cl. .................. 73/117.01
(58) Field of Classification Search .......... 73/117.01, 73/118.01, 118.02
See application file for complete search history.

(56) References Cited

U.S. PATENT DOCUMENTS

| | | | |
|---|---|---|---|
| 6,550,332 B2* | 4/2003 | Lee | 73/583 |
| 7,240,544 B2* | 7/2007 | Mallebay-Vacqueur et al. | 73/147 |
| 7,421,321 B2* | 9/2008 | Breed et al. | 701/29 |
| 2003/0164044 A1* | 9/2003 | Gayle | 73/592 |
| 2004/0165735 A1* | 8/2004 | Opitz | 381/92 |
| 2006/0137439 A1* | 6/2006 | Mallebay-Vacqueur et al. | 73/147 |
| 2008/0034869 A1 | 2/2008 | Heinz et al. | |
| 2008/0159559 A1* | 7/2008 | Akagi et al. | 381/92 |
| 2008/0228433 A1 | 9/2008 | Meyer et al. | |

FOREIGN PATENT DOCUMENTS

| | | |
|---|---|---|
| DE | 203 20 885 U1 | 5/2005 |
| DE | 197 36 021 B4 | 12/2005 |
| WO | WO 2004/068085 A2 | 8/2004 |
| WO | WO 2005/045376 A1 | 5/2005 |

OTHER PUBLICATIONS

Dirk Doble, Gunnar Heilmann—Perspectives of the Acoustic Camera, Aug. 2005.
Dobler D et al., "Perspectives of the acoustic camera" Inter noise environmental noise control. The 2005 Congress and Exposition on Noise Control Engineering.

* cited by examiner

*Primary Examiner*—Eric S McCall
(74) *Attorney, Agent, or Firm*—Gerald E. Hespos; Michael J. Porco

(57) ABSTRACT

An apparatus and method for testing flow noise of a motor vehicle are provided. The apparatus includes a blast nozzle device having at least one blast nozzle, and a transport device. The blast nozzle device is designed for the targeted impingement of the outer skin of the motor vehicle by air flow, and the transport device is designed such that the blast nozzle device and the motor vehicle may be moved relative to one another. A microphone array is positioned in the interior of the motor vehicle and measures the flow noise in the interior of the motor vehicle. The microphone array is preferably a spherical array. The flow noise in the interior of the motor vehicle generated by the air flow is measured by use of the microphone array.

16 Claims, 1 Drawing Sheet

APPARATUS AND METHOD FOR TESTING FLOW NOISE

CROSS-REFERENCE TO RELATED APPLICATION

This application claims the priority of German Application No. 10 2007 020 878.4, filed May 4, 2007, the disclosure of which is expressly incorporated by reference herein.

BACKGROUND AND SUMMARY OF THE INVENTION

The invention relates to an apparatus for testing flow noise of a motor vehicle and, in particular, to an apparatus having a blast nozzle device with at least one blast nozzle and a transport device. The blast nozzle device is designed for the targeted impingement of the outer skin of the motor vehicle by air flow, and the transport device is designed in such a way that the blast nozzle device and the motor vehicle may be moved relative to one another. The invention further relates to a corresponding method for testing flow noise of a motor vehicle.

German Utility Model DE 203 20 885 U1 describes an apparatus of the afore-mentioned type, which is designed in the manner of a test bench, whereby the blast nozzle device which includes at least one blast nozzle may be routed past regions of the outer skin of the bodywork of a passenger vehicle by way of a transport device. A disadvantage of the known apparatus is that the test results are not based on objective measurements, but rather on the subjective impression of the tester, which results in an unavoidable variation. The measurement process for the known apparatus is not reproducible with sufficient reliability.

There is therefore needed an apparatus and a method for testing flow noise of a motor vehicle, in particular a passenger vehicle, wherein the disadvantages of the prior art are avoided and the measurement of flow noise produced by the impingement of the outer skin of the motor vehicle by air flow may be carried out in a particularly precise, reliable, and objective manner.

According to the invention, an apparatus is provided for testing flow noise of a motor vehicle, the apparatus comprising a blast nozzle device having at least one blast nozzle and a transport device. The blast nozzle device is designed for the targeted impingement of the outer skin of the motor vehicle by air flow, and the transport device is designed in such a way that the blast nozzle device and the motor vehicle may be moved relative to one another. A microphone array is provided, which is designed for positioning in the interior of the motor vehicle and for measurement of the flow noise in the interior of the motor vehicle.

Further, according to the invention, a method is provided for testing flow noise of a motor vehicle, wherein a blast nozzle device and the motor vehicle are moved relative to one another. The outer skin of the motor vehicle is impinged on in a targeted manner by air flow by use of the blast nozzle device. The flow noise in the interior of the motor vehicle generated by the air flow is measured by use of a microphone array. Advantageous refinements of the invention are described and claimed herein.

The primary advantages achieved by the invention are that an objective localization of the source of errors that is independent of the subjective impression of an evaluator is made possible for wind noise, which may be perceived in the interior of the motor vehicle. The testing is carried out with very high reliability and measurement accuracy.

The reliability of localization of the source of noise in the interior of the motor vehicle may be further increased by the use of a microphone array designed as a spherical array. In this manner, in particular interference effects in the relevant frequency range above 1000 Hz may be avoided.

The microphone array may advantageously be coupled to an optical recording device. In this manner, it is possible to establish an extremely accurate and reliable relationship between noise sources and the structure of the interior of the motor vehicle.

A connecting device may advantageously be provided, which is preferably connected to the microphone array, and by which the microphone array may be positioned in the motor vehicle such that a defined position of the microphone array relative to one or more elements in the interior of the motor vehicle is ensured. Particularly reliable and reproducible test results may be obtained in this manner.

The orientation of the blast nozzles of the blast nozzle device may advantageously be adapted to the outer contour of the motor vehicle to be tested. This adaptation may be made continuously during the test procedure. In this manner, even motor vehicles with very different outer contours may be tested in direct succession, if necessary, without the need for complicated repositioning or resetting activities, for example. In this regard, it may be practical to measure the outer contour of the motor vehicle, for example by use of one or more optical sensor devices. To adapt the orientation of the blast nozzles to the outer contour of the motor vehicle, one or more blast nozzles of the blast nozzle device may be pivotable so as to be adjustable in the vertical, longitudinal, and/or transverse directions.

Other objects, advantages and novel features of the present invention will become apparent from the following detailed description when considered in conjunction with the accompanying drawings.

DETAILED DESCRIPTION OF THE DRAWINGS

Figure 1:
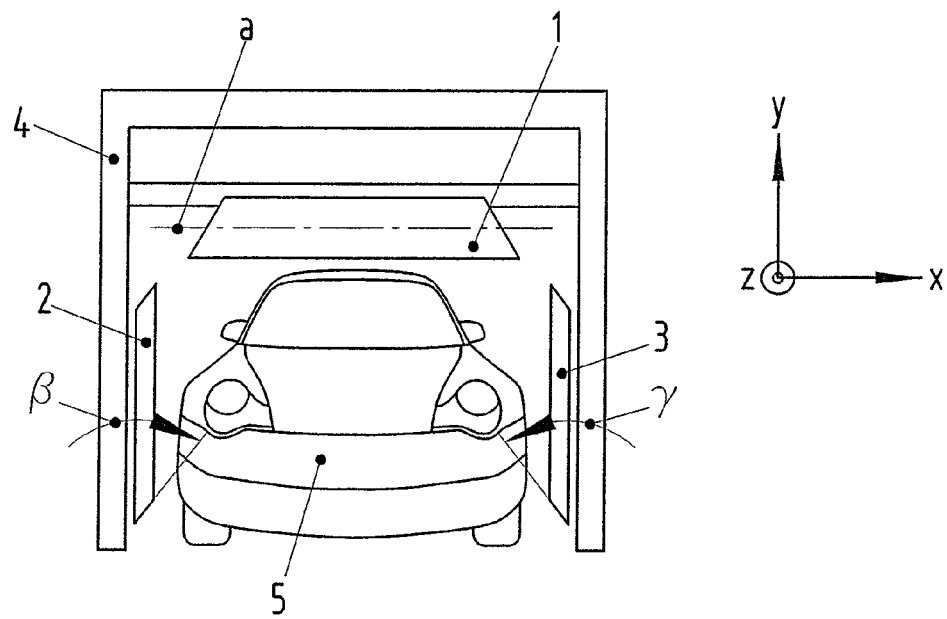
FIG. 1 is a schematic front view of the test apparatus.

FIG. 1 shows an apparatus for testing flow noise of a motor vehicle 5, in particular a passenger vehicle, the apparatus having a blast nozzle device including multiple blast nozzles 1, 2, 3. During the test procedure, the motor vehicle 5 and the blast nozzle device are moved relative to one another. The motor vehicle 5 and/or the blast nozzle device may be moved by way of at least one transport device (not further illustrated). The transport device may have one or more moving belts, for example, for moving the motor vehicle 5. In the example shown, the blast nozzles of the blast nozzle device are connected to a frame apparatus 4. For moving the blast nozzle device, the frame apparatus 4 may be moved via track rollers, for example.

Flow noise may be air noise, for example, which is perceived in the interior of the motor vehicle. Flow noise may also be, for example, aeroacoustically-induced noise in the interior of the motor vehicle.

In the example shown, a blast nozzle 1 is provided, which during the test procedure is located essentially above the motor vehicle 5 and may be adjusted at least in the vertical direction y. The blast nozzle 1 may also be pivotable about an axis a, this axis a extending at least substantially parallel to the transverse direction x. The blast nozzles 2 and 3, which are positioned essentially on the sides of the motor vehicle 5 during the test procedure, may be adjustable in the transverse direction x, vertical direction y, and/or longitudinal direction z. The blast nozzles 2 and 3 may also be inclined at an angle β or γ, respectively. A rotation may occur about an axis (not further illustrated) extending at least substantially in the longitudinal direction z. The blast nozzles 1, 2, 3 may also be located, at least intermittently, in front of or behind the motor vehicle 5. The blast nozzles 2 and 3 also are pivotable, in particular pivotable in each case about an axis situated in the vertical direction y. The blast nozzles 1, 2, 3 may be designed, for example, as adjustable nozzle strips.

By use of one or more of the measures described above, for example, the orientation of the blast nozzles 1, 2, 3 of the blast nozzle device may be adapted to the outer contour of the motor vehicle 5. By adapting the orientation of the blast nozzles 1, 2, 3 to the vehicle contour, vehicles with very different outer contours may be tested in succession, if necessary, in particular in direct succession, and in alternation using the same apparatus for testing air noise. For adapting the orientation of the blast nozzles 1, 2, 3, the outer contour of the motor vehicle 5 may be measured, for example, by use of at least one sensor device, not further illustrated. The at least one sensor device may be an optical sensor device, for example.

Figure 2:
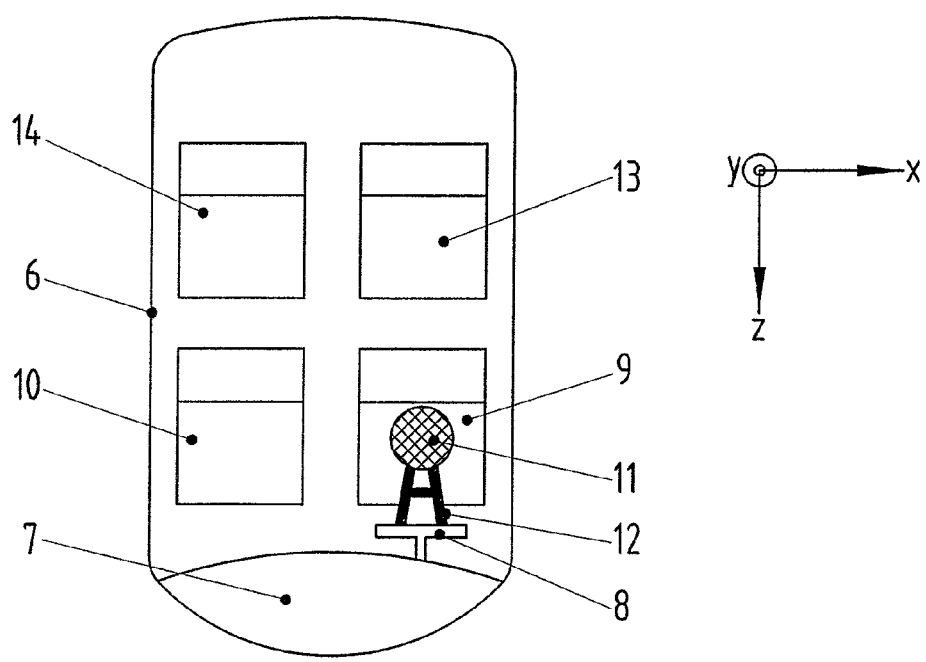
FIG. 2 is a schematic cross section of the motor vehicle to be tested.

FIG. 2 shows a schematic cross section of a motor vehicle 5 (see FIG. 1), wherein the sectional plane lies in the transverse direction x and the longitudinal direction z. The interior of the motor vehicle has a boundary 6. Only a few elements of the interior of the motor vehicle 5 are indicated in FIG. 2. FIG. 2 schematically shows a dashboard 7, a steering wheel 8, a driver's seat 9, a front passenger seat 10, and back seats 13, 14. A microphone array 11 is situated in the interior of the motor vehicle 5 for measuring the interior air noise.

The microphone array 11 may be designed as a so-called acoustic 3D camera. As indicated in the illustrated example, the microphone array 11 is preferably designed as a spherical array in which multiple microphones are positioned in a spherical configuration. The microphone array 11 may be coupled to an optical recording device. A digital camera is preferably used as an optical recording device. It is practical to position the microphones around the optical recording device, for example, around a digital camera, such as in a spherical configuration. To ensure reliably reproducible test conditions, in the illustrated example the microphone array 11 is connected to a connecting device 12. The connecting device 12 is coupled to one or more elements of the interior of the motor vehicle 5. Thus, for example, as indicated in FIG. 2, the connecting device 12 may be connected to the steering wheel 8. By use of the connecting device 12, the position of the microphone array 11 in the interior of the motor vehicle 5, i.e., in particular the distance and/or the orientation of the microphone array 11 in relation to one or more elements of the interior and/or to the boundary 6 of the interior, may be defined. The connecting device 12 may be designed in the manner of a stand, for example. The connecting device 12 may be designed, for example, for positioning on the driver's seat 9, the front passenger seat 10, or also for positioning between the driver's seat 9 and the front passenger seat 10, for example. Alternatively or additionally, the connecting device 12 may be designed for detachable fastening to an element of the interior, for example, for latching onto the steering wheel 8.

The measurement data from the microphone array 11 are preferably transmitted wirelessly to a test bench computer (not further illustrated). The test bench computer may have a control device, which may be designed for controlling and/or evaluating the measurements by the microphone array 11 and/or for controlling the transport device. The control device may also be coupled to the at least one sensor device for measuring the vehicle contour, and may be coupled to actuators (not further illustrated) for the blast nozzles 1, 2, 3. By use of the control device, the orientation of the blast nozzles 1, 2, 3 of the blast nozzle device may be adapted, if necessary, to the outer contour of the motor vehicle 5, which is measured by way of the at least one sensor device. By virtue of the adaptable orientation of the blast nozzles 1, 2, 3 and the design of the blast nozzles 1, 2, 3 with a large number of adjustment possibilities, the incident air flow may be applied to the outer contour of the vehicle at a small distance. The blast nozzle device may have sound absorbers (not further illustrated) to reduce fan noise. In addition, absorbers (not further illustrated) may be provided for suppression of reflections.

By use of the test bench computer, the differences in propagation times of the acoustic signals in the interior of the motor vehicle in relation to the microphones mounted on the spherical array may be evaluated. Thus, for example, by use of a fast Fourier transform (FFT) analysis, acoustic weak points in the interior of the motor vehicle may be identified. Particularly reliable and efficient evaluation results may be obtained when optical recording devices and their signals are used in addition to the acoustic microphones. An optical 3D camera, preferably a digital 3D camera, is preferably used, possibly with superposition of the acoustic and optical recordings. Acoustic weak points are in particular points in the interior, or at the boundary 6 of the interior of the motor vehicle, at which noise-generated air flow occurs. This may be the case when faulty seals, for example, are present. A comparison with reference vehicles, and thus a good/bad test of the motor vehicle 5, may be automatically performed in the test bench computer. By use of the test bench computer, the identified noise sources may be projected onto a vehicle-specific interior surface previously entered in the test bench computer. The test results may also be graphically represented in the form of a layout of the interior surface on a two-dimensional medium, wherein noise sources may be represented by color, for example. In particular, when the test results are evaluated automatically, on the basis of the data from a reference vehicle, an output device may be used to output information, for example, in text and/or graphical form, concerning the location of origin of the noise, for example, sliding roof, windshield, or a seal in the triangular mirror molding, or optionally in a more precise manner, for example, "front edge of sliding roof."

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for testing flow noise of a motor vehicle, the apparatus comprising:

a blast nozzle device having at least one blast nozzle, the blast nozzle device being operatively configured for targeted impingement of air flow on an outer skin of the motor vehicle;

a transport device operatively configured for moving the blast nozzle device and the motor vehicle relative to one another; and a spherical microphone array positionable in an interior of the motor vehicle, the microphone array being operatively configured to measure flow noise in the interior of the motor vehicle.

2. The apparatus according to claim 1, further comprising at least one optical recording device, the optical recording device being operatively coupled with the microphone array.

3. The apparatus according to claim 1, further comprising a connecting device operatively configured to position the microphone array at a defined location relative to one or more elements in the interior of the motor vehicle.

4. The apparatus according to claim 1, further comprising a control device for at least one of controlling the movement of the transport device, controlling measurements by the microphone array, and evaluating measurements by the microphone array.

5. The apparatus according to claim 1, wherein the at least one blast nozzle is adjustable at least in a transverse direction and inclinable at least by a defined angle.

6. The apparatus according to claim 1, wherein the microphone array includes a wireless interface for coupling with a test bench computer.

7. The apparatus according to claim 1, wherein the at least one blast nozzle is adjustable at least in a vertical direction and is pivotable at least about one axis extending in a traverse direction.

8. The apparatus according to claim 7, wherein a further blast nozzle is adjustable at least in a transverse direction and inclinable at least by a defined angle.

9. An apparatus for testing flow noise of a motor vehicle, the apparatus comprising:
   a blast nozzle device having at least one blast nozzle, the blast nozzle device being operatively configured for targeted impingement of air flow on an outer skin of the motor vehicle;
   a transport device operatively configured for moving the blast nozzle device and the motor vehicle relative to one another;
   a microphone array positionable in an interior of the motor vehicle, the microphone array being operatively configured to measure flow noise in the interior of the motor vehicle; and
   at least one optical recording device, the optical recording device being operatively coupled with the microphone array.

10. The apparatus according to claim 9, wherein microphones of the microphone array are positioned around the optical recording device.

11. A method for testing flow noise of a motor vehicle, the method comprising the acts of:
    moving a blast nozzle device and a motor vehicle relative to one another;
    arranging a microphone array at a defined position in an interior of the motor vehicle;
    impinging air flow in a targeted manner on an outer skin of the motor vehicle via the blast nozzle device; and
    measuring the flow noise generated by the impinging air flow in an interior of the motor vehicle via the microphone array; and
    wirelessly transmitting measurement data concerning the flow noise from microphone array to a test bench computer.

12. The method according to claim 11, wherein the microphone array is a spherical array operatively coupled with an optical recording device.

13. The method according to claim 11, the method comprising:
    evaluating differences in propagation times of acoustic signals recorded by individual microphones of the microphone array; and
    identifying noise sources on a vehicle-specific interior surface based upon the evaluated differences.

14. The method according to claim 11, further comprising adapting an orientation of a plurality of blast nozzles of the blast nozzle device to an outer contour of the motor vehicle.

15. The method according to claim 14, further comprising:
    measuring the outer contour of the motor vehicle via at least one optical sensor device; and
    utilizing the measurement of the outer contour to adapt the orientation of the blast nozzles to the outer contour of the motor vehicle.

16. An apparatus for testing flow noise of a motor vehicle, the apparatus comprising:
    a blast nozzle device having at least one blast nozzle, the blast nozzle device being operatively configured for targeted impingement of air flow on an outer skin of the motor vehicle, the blast nozzle further being adjustable in at least one of a vertical direction and a transverse direction and being pivotable or inclinable;
    a transport device operatively configured for moving the blast nozzle device and the motor vehicle relative to one another; and
    a microphone array positionable in an interior of the motor vehicle, the microphone array being operatively configured to measure flow noise in the interior of the motor vehicle.

* * * * *